2 Sheets—Sheet 1.
W. H. EARNEST,
Assignor to J. R. EBERT; said EBERT assignor to C. STREIT and H. SCHMIT.
CRADLE.
No. 10,036. Reissued Feb. 14, 1882.
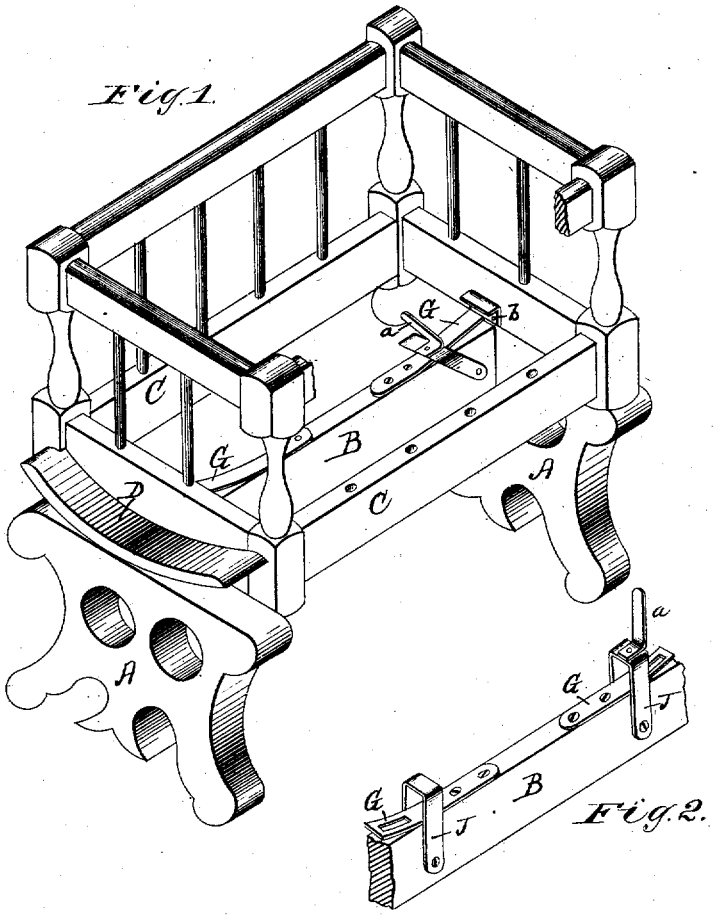
Attest:
Horatio V. Croll
John W. Pierson
Inventor:
Wm. H. Earnest
By Geo. F. Murray
Atty
N. PETERS, Photo-Lithographer, Washington, D. C.

W. H. EARNEST,
Assignor to J. R. EBERT; said EBERT assignor to C. STREIT and H. SCHMIT.
CRADLE.
No. 10,036. Reissued Feb. 14, 1882.
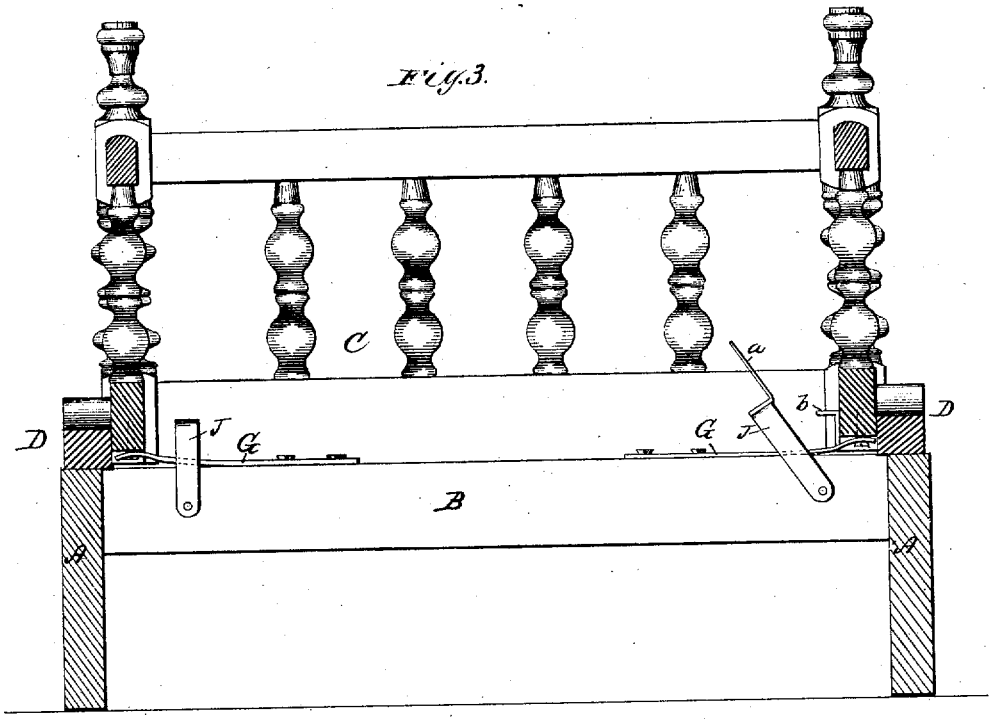
Attest.
Horatio V. Lovell
John W. Punshon
Inventor:
Wm. H. Earnest
By Geo. F. Murray
Atty
N. PETERS, Photo-Lithographer, Washington, D. C.

UNITED STATES PATENT OFFICE.

WILLIAM H. EARNEST, OF PARKERSBURG, WEST VIRGINIA, ASSIGNOR TO JOHN R. EBERT; SAID EBERT ASSIGNOR TO CHARLES STREIT AND HENRY SCHMIT, OF CINCINNATI, OHIO.

CRADLE.

SPECIFICATION forming part of Reissued Letters Patent No. 10,036, dated February 14, 1882.

Original No. 128,375, dated June 25, 1872. Application for reissue filed September 1, 1881.

*To all whom it may concern:*

Be it known that I, WILLIAM H. EARNEST, of Parkersburg, in the county of Wood, State of West Virginia, have invented certain new and useful Improvements in Cradles; and I do hereby declare that the following is a full, clear, and exact description thereof, reference being had to the accompanying drawings, and to the letters of reference marked thereon, making a part of this specification.

My invention relates to that class of cradles in which a rocking frame is mounted upon a stationary platform.

The objects of my invention are, first, to provide a means to attach the rocking frame to the base, so that it may freely vibrate without slipping or turning. A further object is to so attach the rocker to its base as to avoid friction between the parts and wear upon the connecting member. Another object is to prevent the rocking member from vibrating too far, and in case it should rock too far to arrest its motion by yielding pressure, thus preventing sudden jars or shocks, and its object is, finally, to provide a convenient means to lock the rocking member when desired. These objects are accomplished by the means illustrated in the accompanying drawings, in which—

Figure 1 is a perspective view of my improved rocking frame and stand. Fig. 2 is a perspective view of the bar connecting the two end pieces of the stand, with the connection between the same and the rocking frame. Fig. 3 is a vertical longitudinal section of the cradle, (the upper part of the frame broken away,) taken in front of the bar which connects the end pieces of the base.

The stand upon which the rocking frame rests consists of two end pieces, A A, connected by a cross-bar, B. The upper edges of the end pieces are straight.

C represents the rocking frame, constructed in any suitable manner. The rocking frame is provided with rockers D, which are attached on the outer and lower ends of the rocking frame and rest upon the stand. The rocking frame is connected to the stand by means of metal strips G at each end. Each strip G is attached to the upper side of the bar B, and the outer end is perforated or slotted, as shown in Fig. 2. Through this slot passes a headed pin or screw into the lower end piece of the rocking frame. These metal strips thus form keepers to hold the rocking frame to its place on the stand. In the form shown in Fig. 2 the headed pin has play in the slotted end of the keeper, which permits the rocking frame to vibrate freely while it is retained in its place upon the stand. In the form shown in Fig. 3 the same result is accomplished by the curve in the keeper G, even though the headed pin have no play within the perforated end of the spring-keeper G; but in this latter case it is better to allow some play for the pins to avoid fretting the keepers.

Near each end of the bar B is a metal stirrup, J, which passes over and around the keepers G, so as to prevent the rocking frame from rocking too far. The keepers are preferably made of thin flexible metal, that they may yield somewhat after striking the stirrups, and thus avoid a sudden jar or shock should the rocking frame rock too far. One of these stirrups is stationary, while the other is pivoted and provided with a handle, *a*, so as to be turned over a projection, *b*, on the inside of the rocking frame, thus acting as a stop, by means of which the rocking frame may be made stationary when desired.

It is obvious that my improvements are also applicable to rocking-chairs.

Having thus fully described my invention, what I claim as new, and desire to secure by Letters Patent, is—

1. The combination, substantially as specified, of the stand and the rocking frame with the metal keepers G, arranged at right angles to the rockers, one end of said keepers being attached to the rocking frame and the opposite end attached to the stand, for the purpose set forth.

2. The stand A A B and rocking frame, in combination with metal strips or keepers G G, said keepers having their inner ends attached to the bar B and their outer ends slotted and attached to the ends of said rocking frame at right angles to the rockers, substantially as and for the purpose set forth.

3. The combination, substantially as specified, of the stand, the rocking frame resting thereon, and the metal keepers connecting the said stand and rocking frame with the stirrups J J, to limit the motion of the cradle and prevent its rocking too far.

4. The combination of the stand A B, rocking frame, metal strips or keepers G G, stirrups J J, and projection *b*, all constructed and arranged substantially as and for the purpose herein set forth.

In testimony that I claim the foregoing I have hereunto set my hand.

W. H. EARNEST.

Witnesses:
W. J. ROBB,
ALFRED G. STAGG.